(12) United States Patent
Linss et al.

(10) Patent No.: US 6,227,838 B1
(45) Date of Patent: May 8, 2001

(54) MOLDING MACHINE FOR PRODUCING PLASTIC HOLLOW BODIES

(75) Inventors: Gerhard Linss; Karl-Friedrich Ossberger, both of Weissenburg (DE)

(73) Assignee: Ossberger Turbinenfabrik GmbH & Co., Weissenburg (DE)

( * ) Notice: Subject to any disclaimer, the term of this patent is extended or adjusted under 35 U.S.C. 154(b) by 0 days.

(21) Appl. No.: 09/275,517

(22) Filed: Mar. 24, 1999

(30) Foreign Application Priority Data

Mar. 27, 1998 (DE) .............................................. 198 13 668

(51) Int. Cl.[7] .................................................. B29C 49/78
(52) U.S. Cl. ......................... 425/140; 425/145; 425/149; 425/527; 425/532
(58) Field of Search .................................... 425/140, 149, 425/532, 145, 148, 527, 169, 170

(56) References Cited

U.S. PATENT DOCUMENTS

| 4,179,251 | * | 12/1979 | Hess et al. ............................ 425/140 |
| 4,188,179 | * | 2/1980 | Linss et al. ........................... 425/532 |
| 4,338,071 | * | 7/1982 | Daubenbuchel et al. ............. 425/140 |
| 4,382,761 | * | 5/1983 | Daubenbuchel et al. ............. 425/532 |
| 4,424,178 | * | 1/1984 | Daubenbuchel et al. ............. 425/532 |
| 5,102,588 | * | 4/1992 | Feuerherm ............................ 425/140 |
| 5,330,342 | * | 7/1994 | Linss et al. ........................... 425/532 |
| 5,409,647 | * | 4/1995 | Kiefer et al. ......................... 425/532 |

* cited by examiner

Primary Examiner—Robert Davis
(74) Attorney, Agent, or Firm—Brown & Wood, LLP

(57) ABSTRACT

A molding machine for producing plastic hollow bodies and including at least one extrusion die, an injection plunger element for delivering plasticized plastic material to the at least one extrusion die, two blow mold halves arranged between the extrusion die and triggering device and displaceable toward each other for forming a blow mold in which the preform produced by the extrusion die is received and a hollow body is formed, a computerized control system for controlling parameters of the produced hollow bodies, a pressure-measuring device for determining pressure of the plasticized plastic material delivered to the injection die, weight and height measuring devices for determining weight and height of the produced hollow bodies, data-transmitting and control lines connecting the control system with the measuring devices, and a transfer gripping device for transferring hollow bodies from the blow mold station to the weight and height measuring devices.

6 Claims, 3 Drawing Sheets

MOLDING MACHINE FOR PRODUCING PLASTIC HOLLOW BODIES

BACKGROUND OF THE INVENTION

1. Field of the Invention

The present invention relates to a molding machine for producing plastic hollow bodies and including at least one extrusion die for producing a preform, injection plunger means for delivering plasticized plastic material to the at least one extrusion die, a triggering device displaceable toward and away from the at least one extrusion die, two blow mold halves arranged between the extrusion die and the triggering device and displaceable toward each other for forming a blow mold in which the preform produced by the extrusion die is received and a hollow body is formed upon gas being blown in by the triggering device, a computerized control means, a weight-measuring device for determining weight of the hollow bodies and further control means.

2. Description of the Prior Art

A molding machine of the above-described type, but without a weight-measuring device and other measuring means is disclosed in European patent No. 535,254. Generally, it is known to provide a molding machine, which is disclosed in this European Patent, with a weight-measuring device. The control of produced hollow bodies is effected in a following manner. A hollow body is cut up, according to its length, in three sections, and the thickness is measured at the edges of the cuts. Also, transitional regions at sharp bends of the hollow body profile or at the cuts as well as the end regions of the hollow body and adjoining them middle regions are examined. However, one cannot exclude a possibility of an error during a mass production of hollow bodies, which leads to undesired deviations of the wall thickness. A wall thickness error leads to a premature breaking of a hollow body when it is subjected to a certain stress. A wall thickness error also results in too thick or too thin regions in a hollow body or in formation of a hole in the hollow body. At present, the control of the quality of hollow body is effected manually, which is expensive. The cuts made in a hollow body make it defective and results in a loss of the hollow body. Because not all of the formed hollow bodies are subjected to cut-up, the testing of the non cut-up hollow bodies is incomplete. However, in many cases, e.g., in manufacturing of motor vehicles it is desired that each separate hollow body be subjected to a precise control.

Accordingly, an object of the present invention is to provide a molding machine of the type described above in which each hollow body is automatically tested as to whether it has a uniform wall thickness.

SUMMARY OF THE INVENTION

This and other objects of the present invention, which will become apparent hereinafter, are achieved by providing a molding machine of the above-described type and including a pressure-measuring device for determining pressure of the plasticized plastic material, a weight-measuring device for determining weight of produced hollow bodies; a height-measuring device for determining the height of the produced hollow bodies, data-transmitting lines connecting the pressure-measuring, weight-measuring, and height-measuring devices with the control means, control lines connecting the control means with respective measuring devices, and transfer gripping means for transferring a formed hollow body to the weight-measuring body device and the height-measuring device.

In the molding machine according to the present invention, the control of the hollow bodies is effected automatically, without any loss of the hollow bodies resulting from their testing. Testing of each produced hollow body is insured. The testing or control of the hollow bodies is effected in the machine itself. The pressure of the plasticized plastic material is monitored before the material enters the extrusion die. It is monitored in the injection plunger. According to the present invention, the molding machine is equipped with a transfer gripping device, with the weight and height being measured within the operational region of the transfer gripping device. There is a two-way connection between the three measuring devices and the control means. Through the data transmitting lines, the measured data are communicated to the control means, and the control means monitors the operation of the measuring devices via control lines. The present invention is based on the determination that when predetermined relationships exist between the three measurements, pressure, weight and height for a hollow body, the hollow body would have predetermined ratios of the wall thickness and would be capable of performing a predetermined function. Generally, the predetermined pressure of the plasticized plastic material and a predetermined height of the hollow body, together with a predetermined weight, indicate that the predetermined wall thickness ratios of the hollow body have been obtained.

As a result of the measurements, defective hollow bodies, i.e., hollow bodies for which at least one measurement is outside of a predetermined range, are discarded. Good hollow bodies are delivered to a counter. A hollow body is considered to be good when the measured pressure, the measured weight, and the measured height are within their respective predetermined ranges, and the cutting off of the end region has been registered by the sensor associated with the cutting-off means.

It is possible to measure the pressure of the plasticized plastic material on its way from the injection plunger to the extrusion die. However, it is particularly advantageous when the injection plunger has an actuation hydraulic system, and the pressure-measuring means comprises means for measuring the hydraulic pressure in the actuation hydraulic system of the injection plunger. This indirect measurement of the pressure of the plasticized plastic material reliably predicts the consistency of the plasticized plastic materials and can be easily implemented technically.

In many cases, a hollow body is produced with an end region, e.g., a bottom which is not necessary for the designated function of the hollow body and is, therefore, lately cut off. It is possible to carry out pressure and height measurements of the hollow body with the end region without being yet cut. However, it is preferable and advantageous when a cutting-off device is provided in the operational region of a transfer gripping device which transfers hollow bodies between the preform blow mold station and the weight-and/or height measuring device. This improves the measurement results as an error can occur in the end region.

It is particular preferable and advantageous when the cutting-off device is associated with a sensor for monitoring the cutting-off process. In this way, only cut-off hollow bodies reach the weight-and height measuring devices.

According to a preferred and advantageous embodiment of the present invention, the hollow bodies are elastically compressible in the height direction, and during the height measurement, the measuring piston, which forms part of the height-measuring device, is displaced a predetermined length against a hollow body compressing the same, and a force-measuring device, which registers the force corresponding to the compression of the hollow body, displays a value corresponding to the hollow body height. At that, the measuring piston is displaced downward a predetermined length amount and compresses the hollow body to a greater or lesser degree dependent on the hollow body height. The force, which is necessary for compression of the hollow body, represents a measure of the hollow body height. Such a force-measuring device is simpler to develop than a measuring device which measures the height of a hollow body directly.

The force-measuring device can be supported on the drive rod of the measuring piston or against a support for the hollow body. It is particularly preferable and advantageous when the measuring piston itself is used as a force-measuring element. This eliminates the need in transferring the hollow body between the weight-measuring device and the height measurement device, with the weight-measuring device being used for effecting both measurement, namely, height and weight measurements.

The molding machine according to the present invention can be used for producing hollow bodies having different shapes. A particularly preferable and advantageous use of the molding machine according to the present invention consists in its use for producing bellows. This is because the possibility of a damage resulting from a non-uniform wall thickness is particularly noticeable in bellows and the discrepancy of the wall thickness is particularly undesirable there. A bellows has distinctive folds which are separated by distinctive neck regions. Further, a bellows has two end pieces the inner dimensions of which should be very precise and which are produced by injection molding. Such bellows should be produced in a mass production machines, e.g., as a collar for an axle of a motor vehicle.

BRIEF DESCRIPTION OF THE DRAWINGS

The features and objects of the present invention will become more apparent, and the invention itself will be the best understood from the following detailed description for the preferred embodiments when read with reference to the accompanying drawings. In the drawings.

DETAILED DESCRIPTION OF THE PREFERRED EMBODIMENT

Figure 1:
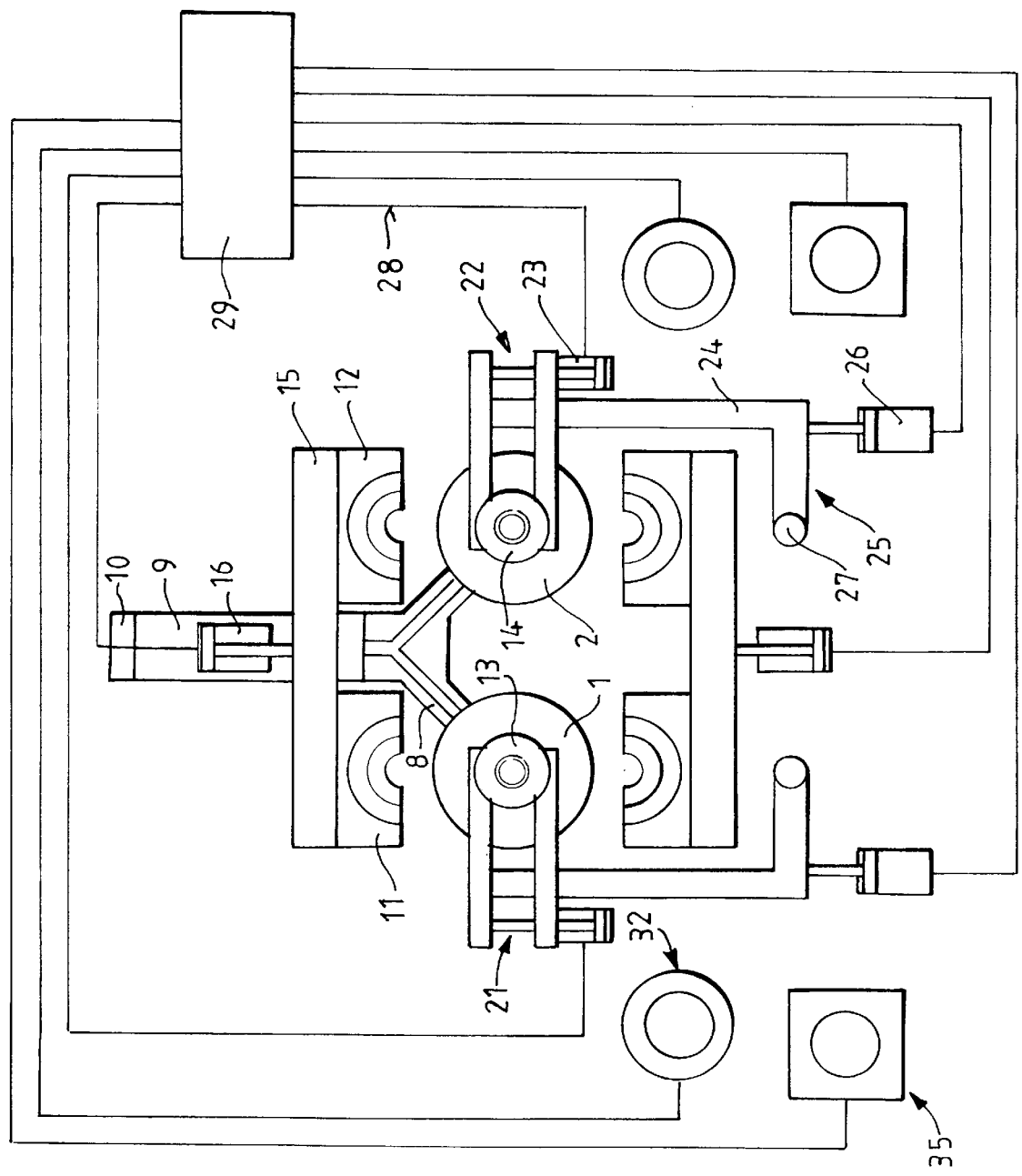
FIG. 1 shows schematically a plan view of a portion of a machine for producing plastic hollow bodies with control devices.

A machine for producing plastic hollow bodies, which is shown in the drawings, includes a common support stand, not shown in the drawings, and two extrusion dies 1 and 2 which are supported on the common stand. Each extrusion die 1, 2 has an extrusion head in which a die torpedo is adjustable with a drive 3, 4, respectively. Each extrusion die 1, 2 has its own drive. Each of the extrusion dies 1, 2 is associated with a respective injection plunger 5, 6 with both injection plungers being connected by a beam 7 connected with a drive 31. Each injection plunger 5, 6 is fed with plasticize plastic material from a plasticizing apparatus 9 with which each injection plunger 5, 6 is connected by a tubular conduit 8. The plasticizing apparatus 9 is equipped with its own drive 10. Each extrusion die 1, 2 produces a hollow body 13, 14, respectively, between the blow mold halves 11, 12. Each two blow mold halves 11, 12, which are arranged next to each other, are connected by a beam 15 connected with its own drive 16.

In the upper portion of the machine, there are provided two triggering devices 17, 18 which also perform a blowing function and are connected by a beam 19. The beam 19 has its own drive 20. The machine for producing hollow bodies further includes two gripping devices 21, 22 with each gripping device 21, 22 having an operating drive 23. Each gripping device 21, 22 is supported on an angular lever 24 of a swivelling link 25. Each angular lever 24 has its own drive 26. The angular lever 24 pivots about a rotational axis 27 and displaces a respective hollow body 13, 14 from a position above the respective extrusion die 1, 2 into a position designated in FIG. 2 with a reference numeral 30.

Each drive 23 is connected by a respective control line 28 with a control apparatus, e.g., a computer 29. The machine further includes respective cutting-off devices 32, a pressure-measuring device 33, cut-off controlling sensors 34, weight—measuring devices 35, and height-measuring devices 36.

Figure 2:
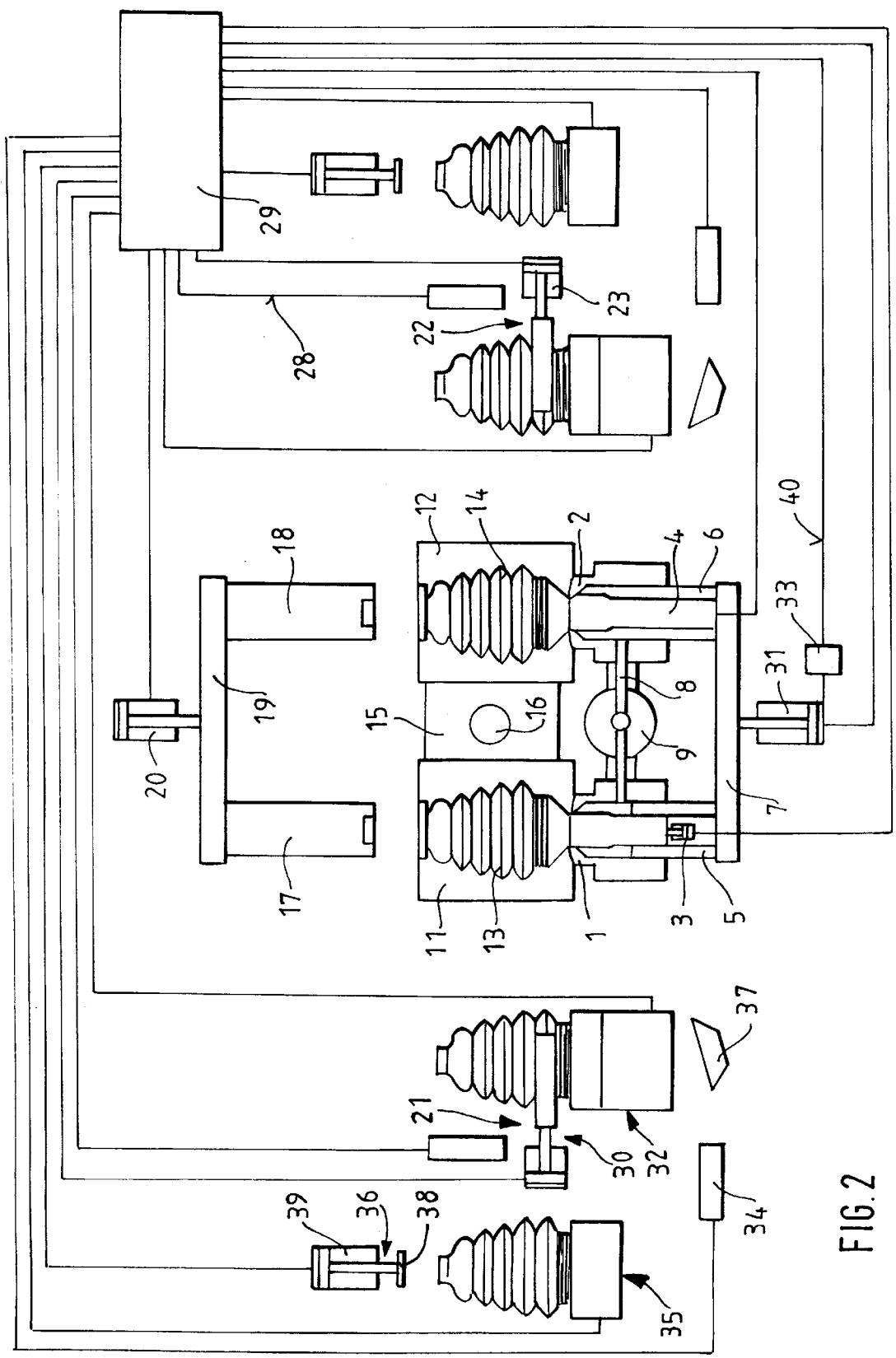
FIG. 2 shows schematically a side view of the machine shown in FIG. 1.

The pressure-measuring device 33, according to FIG. 2, measures the pressure in the hydraulic system of the common drive 31 of the injection plungers 5, 6. Thus, the pressure-measuring device 33 determines, for each workpiece or each hollow body, the pressure of the plasticized material which is delivered to the respective extrusion dies 1, 2. The gripping device 21, 22 brings a respective hollow body 13, 14 to the respective cutting-off device 32 which cuts off an end portion 37 of the respective hollow body 13, 14. The respective sensor 34 monitors the cutting-off of the end region 34. The gripping device 21, 22 further displaces the cut-off hollow body to the weight-measuring devices 35 for determining the weight of the respective hollow body 13, 14. Then, the height-measuring 36 device is actuated. Upon actuation of the height-measuring device, a measurement piston 38 is displaced by a drive 39 from above toward the hollow body and presses the hollow body against the weight-measuring device 35. The measuring devices 33, 35, 36 and the sensors 34 are connected with the computer 29 by data transmitting lines 40.

Figure 3:
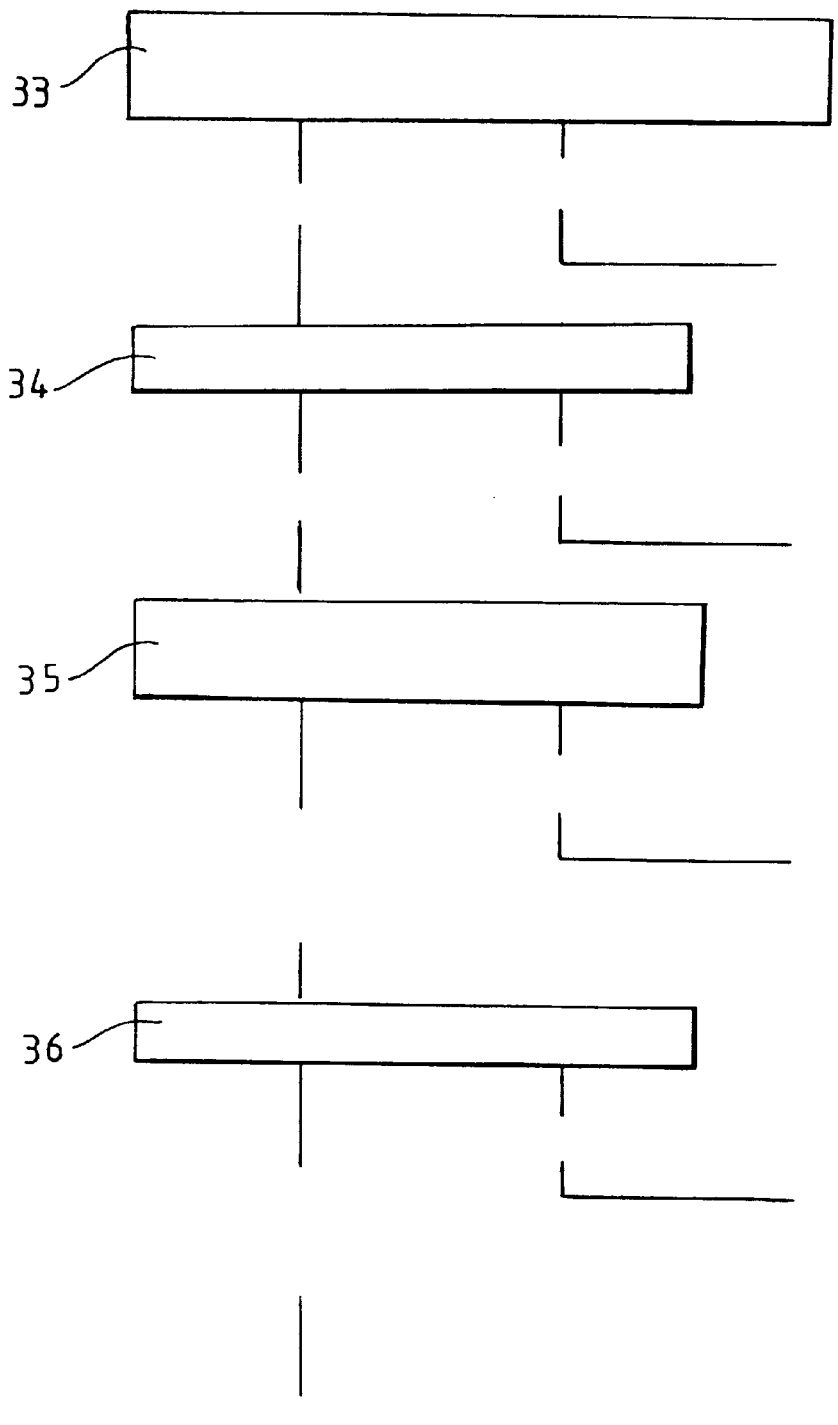
FIG. 3 shows a flowchart of control proceedings in the machine shown in FIG. 1

The flowchart shown in FIG. 3 clarifies the measurement steps of the machine. Defective hollow bodies are delivered to a waste location A. If the pressure-measuring device 33 detects that the measured pressure lies outside of a set range, the hollow body is rejected. If the sensor 34 does not detect a cut-off, the hollow body is rejected. If the weight-measuring device 35 detects that the weight lies outside of a set weight range, the hollow body is rejected. If the height-measuring device detects that the height is outside of the set height range, the hollow body is rejected. The non-rejected, tested hollow bodies are fed to a counter.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A molding machine for producing plastic hollow bodies, comprising:

at least one extrusion die for producing a preform;

injection plunger means for delivering plasticize plastic material to the at least one extrusion die;

a triggering device displaceable toward and away from the at least one extrusion die;

two blow mold halves arranged between the at least one extrusion die and the triggering device and displaceable toward each other for forming a blow mold in which the preform produced by the extrusion die is received and a hollow body is formed upon gas being blown in by the triggering device;

computerized control means for controlling parameters of the produced hollow bodies;

a pressure-measuring device for determining pressure of the plasticized plastic material delivered to the injection die;

a weight-measuring device for determining weight of a produced hollow body;

a height-measuring device for determining a height of the produced hollow body;

data-transmitting lines connecting the pressure-measuring, weight-measuring, and height-measuring devices with the control means;

control lines connecting the control means with respective measuring devices; and transfer gripping means for transferring the formed hollow bodies to weight-measuring device and to the height-measuring device.

2. A machine as set forth in claim 1, wherein the injection plunger means includes operating hydraulic means, and wherein the pressure-measuring means comprises means for measuring hydraulic pressure in the hydraulic means.

3. A machine as set forth in claim 1, further comprising cutting-off means for cutting off an end region of a formed hollow body and located in an operational region of the gripping device between the extrusion die and at least one of the weight- and height-measuring devices.

4. A machine as set forth in claim 3, further comprising a sensor associated with the cutting-off means for monitoring cutting-off of the end region of the hollow body.

5. A machine as set forth in claim 1, wherein the hollow body is resiliently compressible in a height direction, wherein the height-measuring device comprises a measuring piston displaceable a predetermined length and compressing the hollow body, and wherein the compression force applied by the measuring piston is used as a measure of the hollow body height.

6. A machine is set forth is claim 5, wherein the measuring piston cooperates with the weight-measuring device which is used also as a force-measuring device.

\* \* \* \* \*